(12) United States Patent
Han et al.

(10) Patent No.: US 11,881,211 B2
(45) Date of Patent: Jan. 23, 2024

(54) ELECTRONIC DEVICE AND CONTROLLING METHOD OF ELECTRONIC DEVICE FOR AUGMENTING LEARNING DATA FOR A RECOGNITION MODEL

(71) Applicant: SAMSUNG ELECTRONICS CO., LTD., Suwon-si (KR)

(72) Inventors: Changwoo Han, Suwon-si (KR); Kwangyoun Kim, Seoul (KR); Chanwoo Kim, Suwon-si (KR); Kyungmin Lee, Suwon-si (KR); Youngho Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 211 days.

(21) Appl. No.: 17/189,710

(22) Filed: Mar. 2, 2021

(65) Prior Publication Data

US 2021/0304737 A1    Sep. 30, 2021

(30) Foreign Application Priority Data

Mar. 24, 2020  (KR) .................. 10-2020-0035747

(51) Int. Cl.
*G10L 15/18* (2013.01)
*G10L 15/06* (2013.01)
*G10L 15/26* (2006.01)

(52) U.S. Cl.
CPC ............ *G10L 15/18* (2013.01); *G10L 15/063* (2013.01); *G10L 15/26* (2013.01)

(58) Field of Classification Search
CPC ....... G10L 15/18; G10L 15/063; G10L 15/26; G10L 13/00; G10L 15/1822; G10L 25/03
See application file for complete search history.

(56) References Cited

U.S. PATENT DOCUMENTS 8,234,112 B2   7/2012 Kang et al.
8,972,256 B2   3/2015 Rennie et al.
(Continued)

FOREIGN PATENT DOCUMENTS

KR         10-0911429    8/2009
KR     10-2017-0030923   3/2017
(Continued)

OTHER PUBLICATIONS

Li, Jason, et al. "Training neural speech recognition systems with synthetic speech augmentation." arXiv preprint arXiv:1811.00707 (Year: 2018).*

*Primary Examiner* — Bhavesh M Mehta
*Assistant Examiner* — Nandini Subramani
(74) *Attorney, Agent, or Firm* — NIXON & VANDERHYE P.C.

(57) ABSTRACT

Disclosed are an electronic device and a method of controlling the electronic device. An electronic device according to an embodiment may perform a method comprising: performing natural language understanding for a first text included in learning data, obtaining first information associated with a speech corresponding to the first text being uttered based on a result of the natural language understanding, obtain second information associated with an acoustic feature corresponding to the speech corresponding to the first text being uttered based on the first information, obtaining a plurality of speech signals corresponding to the first text by converting a first speech signal corresponding to the first text based on the first information and the second information, and training a speech recognition model based on the plurality of obtained speech signals and the first text.

13 Claims, 11 Drawing Sheets

(56) References Cited

U.S. PATENT DOCUMENTS

| | | | |
|---|---|---|---|
| 9,786,270 B2 | 10/2017 | Senior et al. | |
| 10,062,374 B2* | 8/2018 | Xiao | G10L 15/063 |
| 10,127,905 B2 | 11/2018 | Lee et al. | |
| 10,163,436 B1* | 12/2018 | Slifka | G10L 13/00 |
| 10,573,296 B1* | 2/2020 | Arel | G10L 15/02 |
| 10,629,186 B1* | 4/2020 | Slifka | G10L 15/1815 |
| 2018/0061394 A1* | 3/2018 | Kim | G10L 15/02 |
| 2018/0096677 A1* | 4/2018 | Pollet | G06N 3/045 |
| 2018/0211652 A1* | 7/2018 | Mun | G10L 15/187 |
| 2019/0287525 A1 | 9/2019 | Kim et al. | |
| 2020/0005766 A1 | 1/2020 | Kim | |
| 2020/0335084 A1* | 10/2020 | Wang | G10L 15/063 |
| 2021/0174783 A1* | 6/2021 | Wieman | G10L 15/16 |
| 2021/0272563 A1* | 9/2021 | Iwase | G10L 15/32 |

FOREIGN PATENT DOCUMENTS

| | | |
|---|---|---|
| KR | 10-2019-0103080 | 9/2019 |
| KR | 10-2019-0109868 | 9/2019 |

\* cited by examiner

FIG. 4A

| TEXT | "THE ROAD IS SO CONGESTED NOW, HOW ABOUT MAPO BRIDGE?" | | |
|---|---|---|---|
| PARAMETER | MAIN BODY OF UTTERANCE (AGE) | RECEIVING DEVICE | UTTERANCE PLACE |
| PROBABILITY DISTRIBUTION | ADULT (90%) | NAVIGATION FOR A VEHICLE (60%) | INSIDE OF A VEHICLE (70%) |
| | UNDER-AGED (10%) | SMARTPHONE (40%) | INDOOR SPACE (30%) |

FIG. 4B

| TEXT | "WHERE IS THE GATE FOR THE PLANE BOUND FOR LA TO DEPART SOME TIME LATER?" | | |
|---|---|---|---|
| PARAMETER | MAIN BODY OF UTTERANCE (SPEED OF UTTERANCE) | RECEIVING DEVICE | UTTERANCE PLACE |
| PROBABILITY DISTRIBUTION | FAST (65%) | SMARTPHONE (88%) | AIRPORT (94%) |
| | AVERAGE (35%) | ROBOT (12%) | - |

FIG. 4C

| TEXT | "LET ME KNOW THE COSMETIC BRAND WHICH IS ON DISCOUNT AT A DEPARTMENT STORE" | | |
|---|---|---|---|
| PARAMETER | MAIN BODY OF UTTERANCE (GENDER) | RECEIVING DEVICE | UTTERANCE PLACE |
| PROBABILITY DISTRIBUTION | WOMAN (90%) | SMARTPHONE (85%) | DEPARTMENT STORE (87%) |
| | MAN (10%) | SMARTWATCH (7%) | SIDE OF ROAD (13%) |

FIG. 6

RETRIEVE LEARNING DATA — 610

| | |
|---|---|
| NAME | DEPARTMENT STORE |
| DESCRIPTION | DISCOUNT |
| LANGUAGE | KOREAN ▼ |
| TEXT FILE | [SELECT FILE] textdata.txt |
| AUDIO FILE | [SELECT FILE] audiodata.zip |
| SITUATION INFORMATION SETTING | DISCOUNT INFORMATION QUERY |

[ OK ] [ CANCEL ]

615

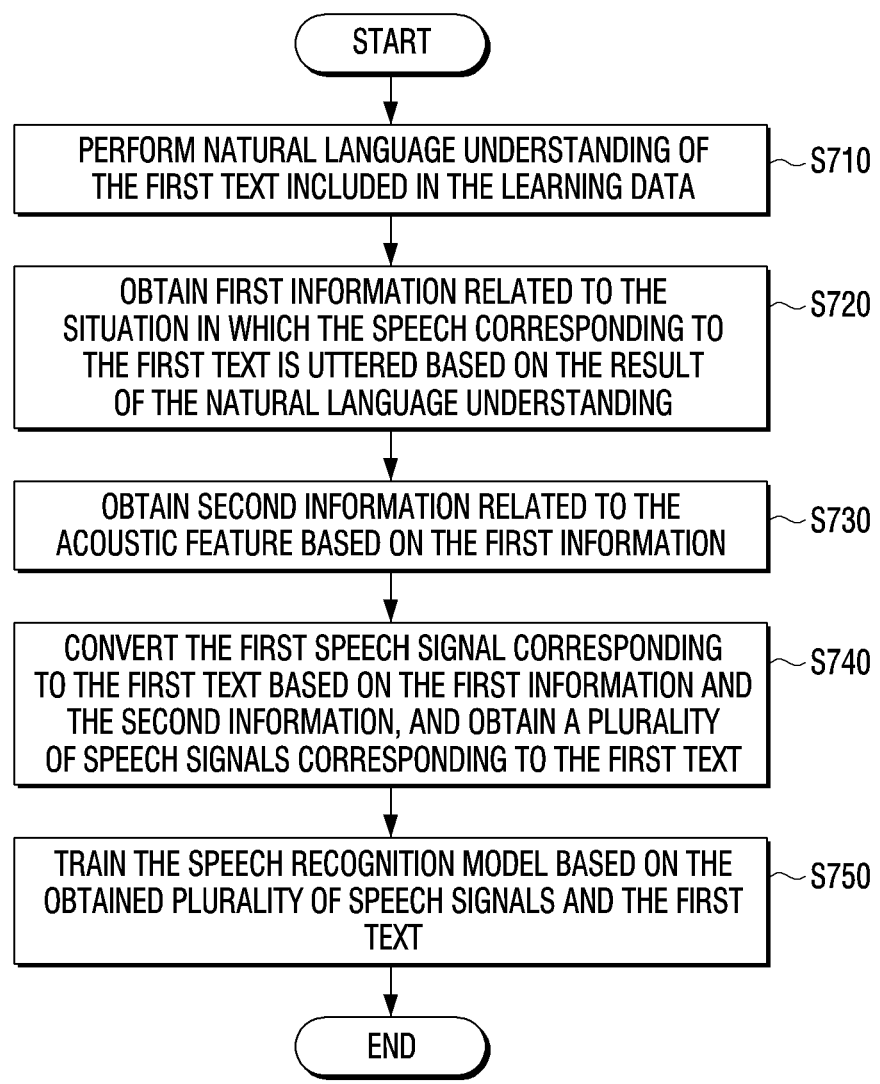

ELECTRONIC DEVICE AND CONTROLLING METHOD OF ELECTRONIC DEVICE FOR AUGMENTING LEARNING DATA FOR A RECOGNITION MODEL

CROSS-REFERENCE TO RELATED APPLICATION

This application is based on and claims priority under 35 U.S.C. § 119 to Korean Patent Application No. 10-2020-0035747, filed on Mar. 24, 2020, in the Korean Intellectual Property Office, the disclosure of which is incorporated by reference herein in its entirety.

BACKGROUND

1. Field

The disclosure relates to an electronic device and a method for controlling the electronic device and, for example, to an electronic device capable of augmenting learning data for a speech recognition model and training a recognition model based on the augmented learning data, and a controlling method thereof.

2. Description of Related Art

In recent years, speech recognition functions are included in various devices according to the development of artificial intelligence field, and therefore, studies have been made to improve the performance of a speech recognition model.

The performance of the speech recognition model may vary according to learning data as well as a learning algorithm for training the speech recognition model. Therefore, it is important to construct a large amount of learning data to improve the performance of the speech recognition model, but there is a problem in that a lot of costs and time may be required to build a large amount of learning data.

Recently, a technology for augmenting the amount of total learning data by generating new data based on a small amount of data gains an attention. In particular, there is a technology for augmenting learning data in a random manner to avoid a problem of overfitting that the learning data is concentrated to a particular region. However, even unnecessary data may be included in the learning data, which may result in an increase of augmentation time of the learning data and an increase in the learning time of the speech recognition model, and may further may result in a reduction in the performance of the speech recognition model.

There is a need for a technology capable of efficiently augmenting learning data for a speech recognition model and improving the performance of a speech recognition model based on augmented learning data.

SUMMARY

Embodiments of the disclosure provide an electronic device capable of efficiently augmenting learning data for a speech recognition model and training a speech recognition model based on the augmented learning data, thereby enhancing a performance of the speech recognition model, and a controlling method thereof.

In accordance with an example embodiment of the disclosure, a method of controlling an electronic device includes: performing natural language understanding for a first text included in learning data; obtaining first information associated with a speech corresponding to the first text being uttered based on a result of the natural language understanding; obtaining second information associated with an acoustic feature corresponding to speech corresponding to the first text being uttered based on the first information; obtaining a plurality of speech signals corresponding to the first text by converting a first speech signal corresponding to the first text based on the first information and the second information; and training the speech recognition model based on the plurality of obtained speech signals and the first text.

In accordance with an example embodiment of the disclosure, an electronic device includes: a memory configured to store at least one instruction and a processor configured to execute the at least one instruction, and the processor, by executing the at least one instruction, is further configured to: perform natural language understanding for a first text included in learning data; obtain first information associated with a speech corresponding to the first text being uttered based on a result of the natural language understanding; obtain second information associated with an acoustic feature corresponding to speech corresponding to the first text being uttered based on the first information; obtain a plurality of speech signals corresponding to the first text by converting a first speech signal corresponding to the first text based on the first information and the second information; and train the speech recognition model based on the plurality of obtained speech signals and the first text.

In accordance with an example embodiment of the disclosure, a non-transitory computer-readable recordable medium having stored thereon a program for executing a controlling method of an electronic device, the program including operations comprising: performing natural language understanding for a first text included in learning data; obtaining first information associated with a speech corresponding to the first text being uttered based on a result of the natural language understanding; obtaining second information associated with an acoustic feature corresponding to speech corresponding to the first text being uttered based on the first information; obtaining a plurality of speech signals corresponding to the first text by converting a first speech signal corresponding to the first text based on the first information and the second information; and training the speech recognition model based on the plurality of obtained speech signals and the first text.

BRIEF DESCRIPTION OF THE DRAWINGS

The above and other aspects, features, and advantages of certain embodiments of the present disclosure will be more apparent from the following detailed description taken, in conjunction with the accompanying drawings, in which:

FIG. 4A is a table illustrating an example of a plurality of parameters and probability of information for each of the plurality of parameters in detail according to various embodiments;

FIG. 4B is a table illustrating an example of a plurality of parameters and probability of information for each of the plurality of parameters in detail according to various embodiments;

FIG. 4C is a table illustrating an example of a plurality of parameters and probability of information for each of the plurality of parameters in detail according to various embodiments;

FIG. 6 is a diagram illustrating an example user interface when an electronic device is implemented to provide a machine learning service according to various embodiments; and, FIG. 7 is a flowchart illustrating an example method of learning a speech recognition model according to various embodiments.

DETAILED DESCRIPTION

Figure 1:
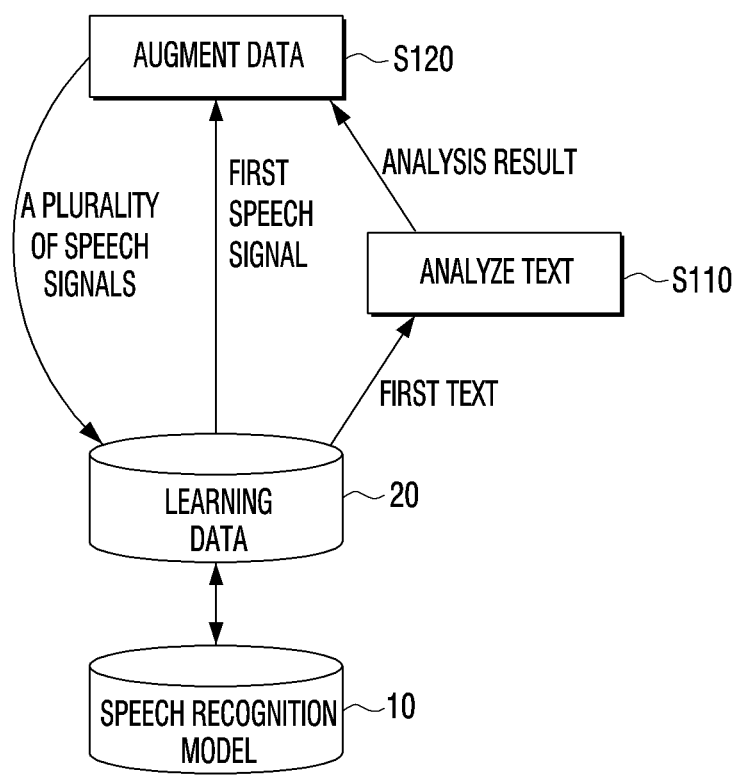
FIG. 1 is a diagram illustrating an example augmentation process of learning data according to various embodiments.

Hereinafter, various example embodiments of the disclosure will be described in greater detail with reference to the accompanying drawings. However, it may be understood that the disclosure is not limited to the various embodiments described hereinafter, but also includes various modifications, equivalents, and/or alternatives to these embodiments. In relation to explanation of the drawings, similar drawing reference numerals may be used for similar elements.

In the following description, a detailed description of the related art may be omitted when it is determined that such description may obscure the gist of the disclosure.

In addition, the following example embodiments may be combined and modified in many different forms, and the scope of the technical spirit of the disclosure is not limited to the following examples. Rather, the example embodiments are provided to convey the technical spirit to those skilled in the art.

The terms used herein are to describe certain embodiments and are not intended to limit the scope of claims. A singular expression includes a plural expression unless otherwise specified.

In this specification, expressions such as "have," "may have," "include," "may include" or the like represent presence of a corresponding feature (for example, components such as numbers, functions, operations, or parts) and does not exclude the presence of additional feature.

In this disclosure, expressions such as "at least one of A [and/or] B," or "one or more of A [and/or] B," include all possible combinations of the listed items. For example, "at least one of A and B," or "at least one of A or B" includes any of (1) at least one A, (2) at least one B, or (3) at least one A and at least one B.

As used herein, the terms "first," "second," or the like may denote various components, regardless of order and/or importance, and may be used to distinguish one component from another, and does not otherwise limit the components.

If it is described that a certain element (e.g., first element) is "operatively or communicatively coupled with/to" or is "connected to" another element (e.g., second element), it should be understood that the certain element may be connected to the other element directly or through still another element (e.g., third element).

On the other hand, if it is described that a certain element (e.g., first element) is "directly coupled to" or "directly connected to" another element (e.g., second element), it may be understood that there is no element (e.g., third element) between the certain element and the another element.

The expression "configured to" used in the disclosure may be interchangeably used with other expressions such as "suitable for," "having the capacity to," "designed to," "adapted to," "made to," and "capable of," depending on cases. Meanwhile, the term "configured to" does not necessarily refer to a device being "specifically designed to" in terms of hardware.

Instead, under some circumstances, the expression "a device configured to" may refer, for example, to the device being "capable of" performing an operation together with another device or component. For example, the phrase "a processor configured to perform A, B, and C" may refer, for example, to a dedicated processor (e.g., an embedded processor) for performing the corresponding operations, or a generic-purpose processor (e.g., a central processing unit (CPU) or an application processor) that can perform the corresponding operations by executing one or more software programs stored in a memory device.

The term such as "module," "unit," "part", and so on may refer, for example, to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor.

It is understood that various elements and regions in the figures may be shown out of scale. Accordingly, the scope of the disclosure is not limited by the relative sizes or spacing drawn from the accompanying drawings.

Hereinafter, with reference to the attached drawings, various example embodiments will be described in greater detail.

FIG. 1 is a diagram illustrating an example augmentation process of learning data according to various embodiments.

The disclosure relates to an electronic device capable of augmenting learning data 20 for training of a speech recognition model 10. The electronic device may refer to an electronic device capable of training a speech recognition model and providing a trained speech recognition model. The electronic device according to the disclosure may be particularly implemented as a server, but is not limited thereto. For example, any electronic device which may train a speech recognition model and provide the trained speech recognition model may correspond to the electronic device according to the disclosure regardless of a type of an electronic device.

An automatic speech recognition model (ASR model) 10 may refer, for example, to an artificial intelligence model which is trained to output a text corresponding thereto, when a speech signal is input. The augmentation of data may refer to a method for increasing the amount of total data by generating new data based on a small amount of data.

The learning data 20 for the speech recognition model 10 may include speech data including a plurality of speech signals and text data including a plurality of texts. In order to clarify the subject matter of the disclosure, an arbitrary speech signal, which is subject to data augmentation among a plurality of speech signals included in the learning data, is referred to as a first speech signal, and text corresponding to the first speech signal is referred to as a first text.

As illustrated in FIG. 1, the electronic device according to the disclosure may analyze the first text included in the learning data 20 in operation S110 and may obtain a plurality of speech signals including a second speech signal and a third speech signal by augmenting the first speech signal based on the analysis result of the text in operation S120. The electronic device may obtain a plurality of speech signals corresponding to the first text based on the analysis result of the first text corresponding to the first speech signal, instead of analyzing feature of the first speech signal itself, or randomly sampling the feature of various parameters which can affect the result of the speech recognition and reflecting the same to the first speech signal.

Hereinafter, various example embodiments of the disclosure for a text analysis process in operation S110 and a data augmentation process S120 will be described. Referring to the description of FIG. 1, an example of augmenting data by analyzing a first text "The road is so congested now, how about Mapo Bridge?" is described and probability information for each of the plurality of parameters is illustrated below in FIG. 4A.

The electronic device according to the disclosure may perform a natural language understanding of the first text. For example, the electronic device may input the first text to a natural language understanding model to identify a domain associated with the first text and an intent associated with the first text. For example, the electronic device may identify a domain "traffic" and an intent of "traffic condition guide" by performing natural language understanding of the first text, "the road is so congested how about Mapo Bridge?".

When natural language understanding is performed, the electronic device may obtain first information related to a situation in which the speech corresponding to the first text is uttered based on a result of the natural language understanding. For example, the first information may include probability information for each of a plurality of parameters indicating a situation where a speech corresponding to the first text is uttered. The plurality of parameters may include at least one of a parameter for a main body of the speech, a parameter for a receiving device of the speech, a parameter for an utterance place of the speech, or a parameter of the utterance time of the speech. The probability information for each of the plurality of parameters may include at least one of a probability distribution about which is a main body of the speech, a probability distribution for what is a receiving device of the speech, or a probability distribution for where is the utterance place of the speech.

In describing the disclosure, "first information" may be a term for generally referring to information related to a situation where a speech corresponding to the text is uttered. "A situation where a speech corresponding to the text is uttered" may be classified according to a plurality of parameters. The plurality of parameters may be changed by setting of a developer or a user. In an embodiment, the plurality of parameters may be classified into a parameter for the main body of the speech, a parameter for the receiving device of the speech, a parameter for the location of the speech, and the time of the speech, but the disclosure is not limited thereto. Specific examples of a plurality of parameters are described below.

The process of obtaining probability information for each of the plurality of parameters included in the first information based on the result of the natural language understanding may be performed through a process of matching the domain and intent identified to correspond to the first text according to a pre-defined rule to the probabilities for each of the plurality of parameters, and may be performed through the artificial intelligence model learned to output the probability information for each of the plurality of parameters if the information about the identified domain and the information about the intent are input. The learning of an artificial intelligence model for outputting probability information may be performed based on metadata related to the first text, along with information about the domain associated with the first text and information about the intent associated with the first text. The metadata associated with the first text herein is used to generally refer to data which may be a label in learning of an artificial intelligence model for outputting probability information. An example process for obtaining probability information for each of the plurality of parameters is described in greater detail with reference to FIGS. 2 and 3.

As an example of obtaining first information based on a result of a natural language understanding, if the domain and the intent identified to correspond to the first text are "traffic" and "traffic condition guide," the electronic device may obtain first information including "probability information that the probability of the main body of the speech being an adult is 90% and probability of being an under aged is 10%", "probability that the receiving device of the speech being a navigation for a vehicle is 60% and the probability of being a smartphone is 40%", and "probability information that an utterance space of speech being an inside of a vehicle is 70% and probability of indoor space is 30%." (see FIG. 4A).

When the first information is obtained as described above, the electronic device may obtain second information related to the acoustic feature based on the first information. The second information may include information about the acoustic feature associated with each of the plurality of parameters. The information on the acoustic feature may include sound source data including the acoustic feature, frequency information corresponding to the acoustic feature, and information related to the technique for reflecting the acoustic feature to the first speech signal, or the like. For example, the second information may include at least one of information about the acoustic feature of the main body of the speech, information about a microphone feature of the receiving device, and information on a noise feature of the speech space.

For example, if the first information as described above is obtained, the electronic device may obtain second information including at least one of "information about the frequency feature of the adult speech", "information about the frequency feature of the speech of the under aged", "information about the microphone feature of the vehicle navigation", "information about the microphone feature of the smartphone", "information about the noise feature inside the vehicle" or "information about the noise feature of the indoor space."

In describing the disclosure, the "second information" may be a term for generally referring to information about an acoustic feature associated with each of the plurality of parameters. Since the second information may be determined in relation to each of the plurality of parameters, information on the sound features included in the second information may be determined differently depending on how the plurality of parameters included in the first information are set. Similar to the first information, the second information may also be changed by setting of a developer or a user.

If the second information is obtained as described above, the electronic device may convert the first speech signal corresponding to the first text based on the first information and the second information to obtain a plurality of speech signals corresponding to the first text. Converting the first speech signal to obtain a plurality of speech signals may not include the meaning of removing the first speech signal, but may refer to augmenting the first speech signal by generating a plurality of speech signals based on the first speech signal.

The process of obtaining a plurality of speech signals based on the first information may include obtaining a plurality of speech signals based on probability information for each of the plurality of parameters included in the first information. The electronic device may obtain a plurality of speech signals so that the entire speech signal corresponding to the first text in the learning data 20 includes an acoustic feature of a ratio corresponding to the probability information for each of the plurality of parameters.

For example, when the first information is obtained as in the above-described embodiment, the electronic device may obtain a plurality of speech signals such that the ratio of the speech signal including the "frequency feature of the speech of the adult and the speech signal including "frequency feature of the speech of the under aged" is 90:10, a ratio of the speech signal including "microphone feature of a navigation of a vehicle" and the speech signal including "microphone feature of a smartphone" is 60:40, and the ratio if the speech signal including "noise feature inside a vehicle" and "noise feature of an indoor space" is 70:30, among the entire speech signals corresponding to the first text.

As described above, obtaining a plurality of speech signals so that the entire speech signal corresponding to the first text includes an acoustic feature of a ratio corresponding to the probability information for each of the plurality of parameters is merely an example embodiment. Therefore, the disclosure should not be understood in a sense that the speech recognition model 10 may be trained only after obtaining a plurality of speech signals until the entire speech signal corresponding to the first text includes an acoustic feature of a ratio corresponding to the probability information for each of the plurality of parameters. In other words, the electronic device may convert the first speech signal corresponding to the first text based on probability information for each of the plurality of parameters included in the first information to obtain one speech signal corresponding to the first text, and may train the speech recognition model 10 based on the one obtained speech signal.

For example, when the first information as described above is obtained, the electronic device may obtain one speech signal including the "frequency feature of the speech of an adult" among the entire speech signal corresponding to the first text, train the speech recognition model 10 based on the learning data including the obtained speech signal, and then may perform the augmentation process of the additional speech signal as described above. Furthermore, the augmentation process of the speech signal may be continuously performed until the entire speech signal corresponding to the first text includes the acoustic feature of the ratio corresponding to the probability information for each of the plurality of parameters, but the augmentation process of the speech signal according to the disclosure does not necessarily be performed until the entire speech signal corresponding to the first text includes the acoustic feature of the ratio corresponding to the probability information for each of the plurality of parameters.

That the augmentation process of the speech signal includes the acoustic feature of the ratio corresponding to the probability information for each of the plurality of parameters does not refer to the augmentation process of the speech signal according to the disclosure needing to be terminated. In order to improve the performance of the speech recognition model 10, learning data 20 in a large amount needs to be established, and after the entire speech signal corresponding to the first text includes the acoustic feature of the ratio corresponding to the probability information for each of the plurality of parameters, the augmentation process for the speech signal may be continued, and as such, while the augmentation process of the speech signal is continuously performed, the augmentation process of the speech signal may be performed so that the entire speech signal corresponding to the first text includes the acoustic feature of the ratio corresponding to the probability information for each of the plurality of parameters.

The process of obtaining a plurality of speech signals based on the second information may include generating a plurality of speech signals in which the first speech signal is converted by reflecting the acoustic feature associated with the situation where the speech corresponding to the first text is uttered, to the first speech signal. Reflecting the acoustic feature to the first speech signal may refer, for example, to applying various kinds of speech signal synthesis techniques to the first speech signal so that a speech signal including the acoustic feature may be obtained.

The electronic device may obtain a plurality of speech signals using at least one of a method of generating a speech signal including an acoustic feature of a main body of the speech, a method of generating a speech signal including a microphone feature of a receiving device, or a method of generating a noise feature of an utterance place or a speech signal including the noise feature of the utterance time. For example, the electronic device may obtain a speech signal including "frequency feature of a speech of an adult" using vocal tract length perturbation (VTLP) technology. A specific method of obtaining a plurality of speech signals based on the second information is described with reference to FIGS. 5A, 5B and 5C.

When a plurality of speech signals are acquired as described above, the electronic device may train the speech recognition model 10 based on the received plurality of speech signals and the first text. When a plurality obtained speech signals are input to the speech recognition model 10, the electronic device may train the speech recognition model 10 to output the first text. The electronic device may train the speech recognition model 10 to output the first text when the first speech signal is input, but may also train the speech recognition model 10 to output the first text when a plurality of speech signals obtained by augmenting the first speech signal are input.

According to an embodiment as described above, the electronic device may efficiently augment the learning data 20 for the speech recognition model 10, and may improve the performance of the speech recognition model 10 by training the speech recognition model 10 based on the augmented learning data 20.

Figure 2:
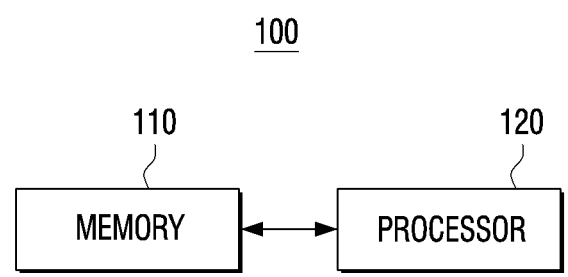
FIG. 2 is a block diagram illustrating an example configuration of an electronic device according to various embodiments.
Figure 3:
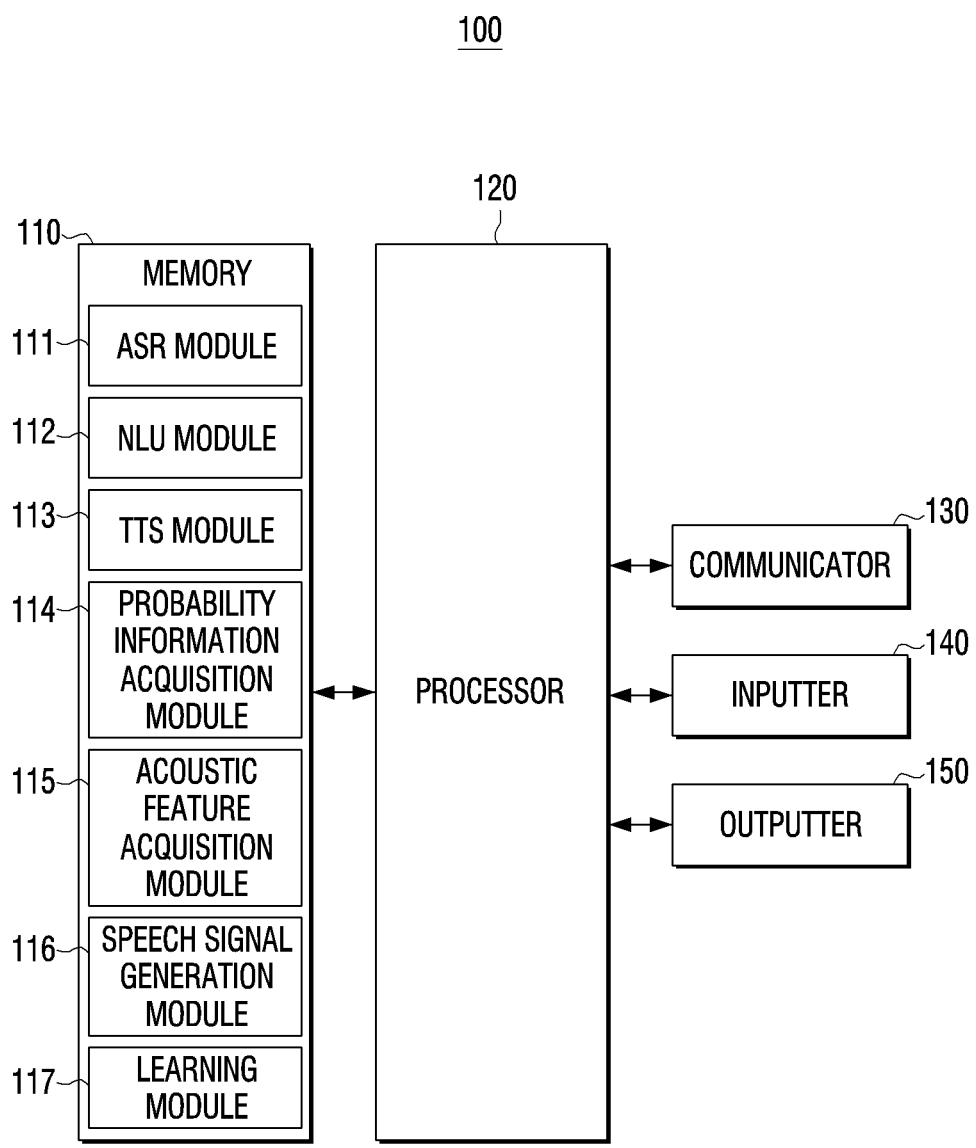
FIG. 3 is a block diagram illustrating an example configuration of an electronic device including an example structure of a software module according to various embodiments.

FIG. 2 is a block diagram illustrating an example configuration of an electronic device 100 according to various embodiments, and FIG. 3 is a block diagram illustrating an example configuration of the electronic device 100 including an example structure of a software module according to various embodiments.

As illustrated in FIG. 2, the electronic device 100 according to an embodiment may include a memory 110 and a processor (e.g., including processing circuitry) 130. The memory 110 may store a plurality of modules as illustrated in FIG. 3. The electronic device 100 may further include a communicator (e.g., including communication circuitry) 130, an inputter (e.g., including input circuitry) 140, and an outputter (e.g., including output circuitry) 150. The configuration of FIG. 2 or FIG. 3 is merely an example, and in various embodiments, one or more components may be added or omitted.

At least one instruction regarding the electronic device 100 may be stored in the memory 110. In addition, an operating system (O/S) for driving the electronic device 100 may be stored in the memory 110. The memory 110 may store various software programs or applications for operating the electronic device 100 according to various embodiments. The memory 110 may include a semiconductor memory such as a flash memory, a magnetic storage medium such as a hard disk, or the like.

For example, the memory 110 may store various software modules for operating the electronic device 100, and the processor 120 may control the operation of the electronic device 100 by executing various software modules that are stored in the memory 110. That is, the memory 110 may be accessed by the processor 120, and may perform reading, recording, modifying, deleting, updating, or the like, of data by the processor 120.

Various information required in a range to achieve the objective of the disclosure may be stored in the memory 110, and the information stored in the memory 110 may be updated by receiving from a server or an external device or being input by a user. It is understood that the term memory 110 may be used to refer to a ROM (not shown), RAM (not shown), or a memory card (for example, a micro SD card, a memory stick) mounted to the electronic device 100.

In various embodiments, the memory 110 may store a plurality of modules such as, for example, and without limitation, an ASR module 111, an NLU module 112, a probability information acquisition module 114, a speech signal generation module 116, a learning module 117, and a TTS module 113. At least a portion of the plurality of modules may be included in an external device, and the electronic device 100 may receive and obtain a result according to the corresponding module from an external device. At least a part of the plurality of modules may be used as a term to specify software to perform a predetermined operation using an artificial intelligence model. Each of a plurality of modules will be described in brief, and the control process according to various embodiments will be described in the description of the processor 120.

An automatic speech recognition (ASR) module 111 may refer, for example, to a module which obtains a text corresponding to the speech signal using a speech recognition model. The speech recognition model may include an acoustic model (AM), a pronunciation model (PM), a language model (LM), or the like. The AM may extract acoustic features of the received user speech and acquire a phoneme sequence. The PM may include a pronunciation dictionary (pronunciation lexicon), and map the acquired phoneme sequence to a word to acquire a word sequence. The LM may assign a probability to the acquired word sequence. That is, the ASR model can acquire a text corresponding to the user speech through an artificial intelligence (AI) model such as AM, PM, and LM. The ASR model may include an end-to-end speech recognition model where components of AM, PM and LM are combined into a single neural network.

A natural language module (NLU) model 112 may refer, for example, to a module which performs natural language understanding using a natural language understanding model. The natural language understanding model may include a domain classifier and an NLU engine. The domain classifier may identify a domain corresponding to the input speech signal among the plurality of predefined domains. The NLU engine may classify grammatical units (e.g., at least one of words, phrases, morphemes, etc.) of the input text and identify which grammatical element the classified grammatical units have. The NLU engine may determine the meaning of the text based on the identified grammatical element. The NLU engine may also acquire information about the user's intent by matching the determined meaning of the text to the identified domain, intents included in the identified domain, or the like.

A text-to-speech (TTS) module 113 may refer, for example, to a module for generating a speech signal corresponding to the text from text using a speech synthesis model. If there is no speech signal corresponding to the first text in the learning data, the TTS module 113 may input the first text to the speech synthesis model to synthesize a first speech signal corresponding to the first text. The TTS module 113 may input the first text to a multi-speaker text-to-speech model to obtain a speech signal to which the speech feature of the main body of the speech is reflected.

The probability information acquisition module 114 may refer, for example, to a module for obtaining first information related to a situation where a speech corresponding to the first text is uttered. The probability information acquisition module 114 may obtain probability information for at least one of a parameter for a main body of a speech, a parameter for the receiving device of the speech, a parameter for a speech location of the speech, and a parameter of the speech time of the speech based on the result of the natural language understanding. The process of obtaining probability information for each of the plurality of parameters may be performed through a process of matching a domain and an intent identified as corresponding to the first text according to the predefined rule to a probability for each of the plurality of parameters, and may be performed through an artificial intelligence model (neural network model) trained to output probability information for each of the plurality of parameters, when the information about the identified domain and the information about the intent are input.

In describing the disclosure, an artificial intelligence model learned to output probability information is briefly referred to as "probability information acquisition model". In addition, the process of obtaining probability information for each of the plurality of parameters may be performed using a process of matching a domain and an intent identified to correspond to a first text according to a predefined rule to a probability for each of a plurality of parameters, and using a probability information acquisition model trained based on the metadata associated with the first text. A detailed operation through the probability information acquisition module 114 will be described above in the description of the processor 120.

In describing the disclosure, since the NLU module 112 and the probability information acquisition module 114 may be implemented as separate modules, this is to clearly illustrate each operation according to the disclosure, and the disclosure is not limited to the case where the NLU module 112 and the probability information acquisition module 114 are implemented as separate modules. The natural language understanding model according to the disclosure may be implemented so as to obtain a probability information for each of a plurality of parameters, as well as an intent associated with the first text and the intent associated with the first text, and the NLU module 112 may obtain first information related to the situation where the speech corresponding to the first text is uttered using the natural language understanding model implemented to obtain the probability information for each of the plurality of parameters. In addition, some of the modules according to the disclosure may be implemented as a single integrated module.

The acoustic feature acquisition module 115 may refer, for example, to a module for obtaining second information related to an acoustic feature corresponding to a situation where a speech corresponding to the first text is uttered. Specifically, the acoustic feature acquisition module 115 may obtain at least one of information on an acoustic feature of the main body of the speech, information about a microphone feature of the receiving device, and information on noise feature of the utterance place, based on the first information.

The speech signal generation module 116 may refer, for example, to a module which converts a first speech signal to obtain a plurality of speech signals corresponding to the first text. Specifically, the speech signal generation module 116 may convert a first speech signal corresponding to the first text based on the first information and the second information to obtain a plurality of speech signals corresponding to the first text.

A learning module 117 may refer, for example, to a module for training an artificial intelligence model. The learning module 117 may train a speech recognition model, a natural language understanding model, and a speech synthesis model, or the like, according to the disclosure based on various types of learning methods such as supervised learning, unsupervised learning, and reinforced learning. The learning module 117 may train a probability information acquisition model according to the disclosure, as will be described below.

The artificial intelligence model including the speech recognition model, the natural language understanding model, and the speech synthesis model may be implemented as an on-device in the electronic device, but this is merely an example, and at least a portion of the artificial intelligence models according to the disclosure may be implemented on an external device or a server, and in this case, the disclosure may be applied.

The processor 120 may include various processing circuitry and control overall operations of the electronic device 100. The processor 120 may be connected to a configuration of the electronic device 100 including a memory 110, a communicator 130, an inputter 140, and an outputter 150, and may control overall operations of the electronic device 100 by executing at least one command stored in the memory 110.

The processor 120 may be implemented in various ways. For example, the processor 120 may be implemented as at least one of an application specific integrated circuit (ASIC), an embedded processor, a microprocessor, a hardware control logic, a hardware finite state machine (FSM), a digital signal processor (DSP), or the like. Further, processor 120 may include at least one of a central processing unit (CPU), a graphic processing unit (GPU), a main processing unit (MPU), or the like.

Various embodiments of the disclosure according to the control of the processor 120 are described. Referring to FIGS. 2 and 3, an example of augmenting the data by performing an analysis on the first text, "where is a gate for the plane bound for LA?", is described, and the probability information for each of the plurality of parameters according to the disclosure is summarized in FIG. 4B.

The processor 120 may perform a natural language understanding of the first text. The processor 120 may input the first text to a natural language understanding model to identify a domain associated with the first text and intent associated with the first text. For example, the processor 120 may perform a natural language understanding of the second text, "where is the gate for the plane bound for LA to depart some time later?" and identify a domain of "travel" and intent "plane boarding guide."

When a natural language understanding is performed, the processor 120 may obtain first information related to a situation in which the speech corresponding to the first text is uttered based on the result of the natural language understanding. Specifically, the first information may include probability information for each of a plurality of parameters indicating a situation where a speech corresponding to the first text is uttered. The plurality of parameters may include at least one of a parameter for the main body of the speech, a parameter for the receiving device of the speech, a parameter for the location of the speech, and a parameter of the time of the speech. The probability information for each of the plurality of parameters may include at least one of a probability distribution on who is the main body of the speech, a probability distribution for what is the receiving device of the speech, and a probability distribution for what is the place for utterance of the speech.

The process of obtaining probability information for each of the plurality of parameters may be performed through a process of matching at least one of a domain and an intent identified to correspond to the first text to the probabilities for each of the plurality of parameters according to the pre-defined rule.

The rule for mapping each domain and intent with the probability information for the corresponding parameters can be pre-defined by the developer. When at least one of a domain and an intent corresponding to the first text is identified, the processor 120 may obtain probability information for a parameter corresponding to at least one of the identified domain and the intent according to the pre-defined rule.

The process of obtaining probability information for each of the plurality of parameters may be performed through an artificial intelligence model trained to output probability information for each of the plurality of parameters, if at least one of information about the identified domain and information on the intention is input. The artificial intelligence model which is trained to output probability information for each of the plurality of parameters will be hereinafter referred to as "a probability information acquisition model."

The learning of the probability information acquisition model may be performed on the basis of metadata related to the first text, along with information about the domain associated with the first text and information about the intent associated with the first text. The metadata associated with the first text is a term for generally referring to data which can be labels in the learning of a probability information acquisition model. The metadata related to the first text may correspond to at least some of the plurality of parameters indicating a situation where the speech corresponding to the first text is uttered. The metadata associated with the first text may be obtained through a sensor included in the electronic device 100 as well as the first text and first speech signal corresponding to the first text.

For example, as a result of performing natural language understanding of the first text, if information about at least one of a main body of the speech, a receiving device of speech, an utterance place of speech, utterance time of speech, the processor may obtain at information about at least one of a main body of the speech, a receiving device of speech, an utterance place of speech, utterance time of speech as metadata related to the first text and store. When a speech signal corresponding to the first text includes noise information that can identify an utterance space of speech, or the utterance place of speech may be identified based on the location information obtained through a global positioning system (GPS) sensor, or the like, the processor 120 may obtain and store information about the utterance location of the speech as metadata related to the first text.

When metadata associated with the first text is obtained as described above, the processor 120 may input at least one of information about the domain associated with the first text and information about the intent associated with the first text to the probability information acquisition model, and output probability information for each of the plurality of parameters based on a label of the learning that is associated with the first text. In particular, the probability information acquisition model may calculate a probability for each of the plurality of parameters to output probability information for each of the plurality of parameters, and may output probability information for each of the plurality of parameters by calculating a conditional probability for at least two of the plurality of parameters.

The process of obtaining probability information for each of the plurality of parameters according to the pre-defined rule, and the process of obtaining probability information for each of the plurality of parameters through the probability information acquisition model are described so far. According to an embodiment, the probability information for each of the plurality of parameters may be obtained using both the pre-defined rule and the probability information acquisition model. When the probability information for each of the plurality of parameters is obtained according to the pre-defined rule, there is an advantage that it is easy to change a rule, but there is a disadvantage in that a considerable effort is required in constructing the pre-defined rule. If the probability information for each of the plurality of parameters is obtained through the probability information acquisition model, there is an advantage that it may be easily implemented if the amount of the learning data is sufficient, but there is a disadvantage that it is difficult to implement to correspond to a new utterance situation that is not included in the learning data.

A probability information acquisition model may be corrected using the rule pre-defined by a developer or a user after training the probability information acquisition model using metadata. For example, when the probability information that "a probability that the main body of the speech corresponding to the first text is a man is 60%" is obtained after training the probability information acquisition model, the developer or the user may correct the probability information acquisition model to obtain the probability information that "a probability that the main body of the speech corresponding to the first text is a main is 80%", by defining a rule such as changing the probability that the main body of the speech corresponding to the first text is a main or giving a predetermined weight.

As an example of obtaining first information based on the result of natural language understanding, if the domain and intent identified to correspond to the first text are "travel" and "plane boarding guide" respectively, the electronic device 100 may obtain first information including "probability information that the utterance speed of the main body of the speech may be fast is 65% and the speed may be average is 35%", "probability information that the receiving device may be a smartphone is 88% and may be a robot is 12%", and "probability information that an utterance space of the speech is an airport is 94%." (see FIG. 4B).

A process of obtaining probability information for each of the plurality of parameters in consideration of the identified domain and the identified intent together is described, but obtaining the probability information for each of the plurality of parameters based on one of the identified domain and the identified intent is possible. Furthermore, various information obtained hierarchically in a process of performing a natural language understanding, such as a keyword or an entity, may be used in a process of obtaining probability information for a plurality of parameters, as well as a domain and an intent.

A process of obtaining first information based on a result of a natural language understanding obtained by inputting a first text into an artificial intelligence model, for example, a natural language understanding model, is described, but according to an embodiment, the first information may be obtained through a process of identifying the words included in the first text and matching the words included in the first text to probability information for each of the plurality of parameters according to the pre-defined rule.

When the first information is obtained as described above, the processor 120 may obtain second information related to the acoustic feature based on the first information. The second information may include information about the acoustic feature associated with each of the plurality of parameters. The information on the acoustic feature may include sound source data including acoustic feature, frequency information corresponding to the acoustic feature, and information related to the technique for reflecting the acoustic to the first speech signal. The second information may include at least one of information about a speech feature of the main body, information about a microphone feature of the receiving device, and information on a noise feature of the utterance space.

For example, when the first information is obtained as in the example above, the processor 120 may obtain second information including at least one of "frequency feature of speech with fast utterance speed," "frequency feature of speech with average utterance speed," "microphone feature of a smartphone," "microphone feature of a robot," or "noise feature of an airport."

The process of obtaining second information related to the acoustic feature based on the first information may include the process of identifying the acoustic feature associated with each of the plurality of parameters included in the first information and the process of obtaining information on the identified acoustic feature. The process of obtaining information on the identified acoustic feature may include identifying information about the acoustic feature pre-stored in the electronic device 100 as well as receiving and obtaining information about the acoustic features from the external device.

As the second information is obtained, the processor 120 may convert the first speech signal corresponding to the first text based on the first information and the second information and obtain a plurality of speech signals corresponding to the first text.

The process of obtaining a plurality of speech signals based on the first information may include obtaining a plurality of speech signals based on probability information for each of the plurality of parameters included in the first information. For example, the processor 120 may obtain a plurality of speech signals so that the entire speech signal corresponding to the first text in the learning data includes an acoustic feature of a ratio corresponding to the probability information for each of the plurality of parameters.

For example, if the first information is obtained, such as in the above-mentioned example, the processor 120 may obtain a plurality of speech signals so that a ratio between a speech signal including "frequency feature of a speech with fast utterance speed" and a speech signal including "frequency feature of a speech with average utterance speed" is 65:35, a ratio between a speech signal including "microphone feature of a smartphone" and a speech signal including "microphone feature of a robot" is 88:12, and a ratio between a speech signal including "noise feature of an airport" and "noise feature of other places" is 94:6.

The process of obtaining a plurality of speech signals based on the second information may include generating a plurality of speech signals in which the first speech signal is converted by reflecting the acoustic feature associated with the situation where the speech corresponding to the first text is uttered to the first speech signal. Reflecting the acoustic feature to the first speech signal may refer to applying various types of speech signal synthesis techniques to the first speech signal so as to obtain the speech signal including the acoustic feature.

The processor 120 may obtain a plurality of speech signals using at least one of a method for generating a speech signal including a speech feature of a main body of the speech, a method for generating a speech signal including a microphone feature of the receiving device, and a method for generating a speech signal including a noise feature of the speech place or a noise feature of the speech time. For example, the processor 120 may use various kinds of noise synthesis techniques to obtain a speech signal including a "noise feature of the airport". For example, the noise synthesis technique may include an additive synthesis method for adding a speech signal corresponding to noise to the first speech signal to synthesize a new speech signal, and a modulation synthesis method for synthesizing a new speech signal by modulating the frequency or amplitude of the first speech signal, or the like. The modulation synthesis method may include a method such as a ring modulation (RM), an amplitude modulation (AM), a frequency modulation (FM), or the like. An example method for obtaining a plurality of speech signals based on the second information will be described above with reference to FIGS. 5A, 5B and 5C.

The process of obtaining the probability information for each of the first information, specifically the plurality of parameters by the electronic device, and obtaining the second information and the plurality of speech signals is described, but according to another embodiment, the probability information for at least one parameter of the plurality of parameters may be preset by the user.

For example, by setting "probability that a main body of a speech may be a woman" to 97% for entire learning data, a part of a plurality of domains classifying learning data, and a part of text included in the learning data, the user may obtain a plurality of speech signals so that the ratio of speech signal including "frequency feature of a speech of a woman" among entire learning data, a part of a plurality of domains classifying learning data, and a part of text included in the learning data becomes 97%. The user may pre-set probability information about a parameter corresponding to a situation desired by a user to various methods, such as presetting "probability that the receiving device of a speech is a robot" to 100%, and in this case, the probability information for remaining parameters may be obtained by an electronic device.

A process of obtaining a plurality of speech signals is described with an assumption that the first speech signal and the first text are included in the learning data, but according to an embodiment, the processor 120 may obtain a plurality of speech signals even when the first speech signal corresponding to the first text is not included in the learning data.

Specifically, if there is no speech signal corresponding to the first text in the learning data, the processor 120 may input the first text to the speech synthesis model to obtain a first speech signal corresponding to the first text, and convert the obtained first speech signal to obtain a plurality of speech signals.

If the first text corresponding to the first speech signal is not present in the learning data, the processor 120 may obtain the first text corresponding to the first speech signal by inputting the first speech signal to the speech recognition model and may augment the first speech signal based on the obtained analysis result of the first text.

If a plurality of speech signals are obtained as described above, the processor 120 may train the speech recognition model based on the received plurality of speech signals and the first text. Specifically, the processor 120 may train the speech recognition model to output the first text when the received plurality of speech signals are input to the speech recognition model. The processor 120 may train the speech recognition model to output the first text when the first speech signal is input, but also may train the speech recognition model to output the first text when a plurality of speech signals obtained by augmenting the first speech signal are input.

The communicator 130 may include a circuit and may communicate with an external device. For example, the processor 120 may receive various data or information from an external device connected through the communicator 130, and may transmit various data or information to an external device. The communicator 130 may include various modules including various communication circuitry including, for example, at least one of a WiFi module, a Bluetooth module, a wireless communication module, and an NFC module.

In various embodiments according to the disclosure, the communicator 130 may receive at least one of a speech signal and a text included in the learning data from an external device. The communicator 130 may receive various information, such as a "sound source file recorded in an airport" as information about the information related to the acoustic feature according to the disclosure, for example, "the noise feature of the airport". At least some of the artificial intelligence models including the speech recognition model, the natural language understanding model, and the speech synthesis model according to the disclosure may be included in the external device. In this case, the communicator 130 may perform communication with the external device to transmit input data to be input to the artificial intelligence model to an external device, and may receive the output data obtained through the artificial intelligence model from the external device.

The inputter 140 may include a circuit, and the processor 120 may receive a user command to control the operation of the electronic device 100 through the inputter 140. For example, the inputter 140 may be implemented as a microphone, a keyboard input receiver, a touch screen, and the like. In various embodiments according to the disclosure, a control command for training a speech recognition model according to the disclosure may be received through the inputter 140, and the speech signal or text included in the learning data may be input directly through the inputter 140.

The outputter 150 may include a circuit, and the processor 120 may output various functions that the electronic device 100 may perform through the outputter 150. For example, the outputter 150 may be implemented as a display, a speaker, or the like. In various embodiments according to the disclosure, the outputter 150 may output various information related to an augmentation result of a plurality of speech signals according to the disclosure, a learning result of the speech recognition model, or the like.

If the electronic device 100 according to the disclosure is implemented as a server capable of providing a so-called machine learning service, the user may transmit least one of the speech signal and the text to the electronic device 100 through an external device (e.g., a client device such as a smart phone) connected to the electronic device 100. When the user inputs a user command for transmitting at least one of the speech signal and the text stored in the external device to the electronic device 100 in the external device, the processor 120 may receive at least one of the speech signal and the text from the external device through the communicator 130, and may augment a speech signal according to various embodiments of the disclosure as described above based on at least one of the received speech signal and the text.

When the electronic device 100 according to the disclosure is implemented to provide a machine learning service to an on-device, the user may directly input at least one of a speech signal or a text through the inputter 140 of the electronic device 140. For example, when a user inputs a speech signal directly through a microphone included in the inputter 140 or directly inputs the text through the keyboard input receiver included in the inputter 140, the electronic device may augment the speech signal based on at least one of the inputted speech signal and the text.

As described above, the probability information for at least one parameter may be pre-set by the user. For example, when the user transmits at least one of the speech signal and the text to the electronic device 100 through the external device, the user may set the probability information for a parameter corresponding to at least one of the transmitted speech signal and the text. When at least one of a speech signal and a text is inputted through the inputter 140 of the electronic device 100, the user may set probability information for a parameter corresponding to at least one of the input speech signal and the text.

The user may preset probability information about a parameter corresponding to a situation desired by a user through the inputter 140 of the electronic device or an external device connected to the electronic device. For example, the user may set "the probability that the main body of the speech is an under-aged" to 80% for a specific text and may set "the probability that the receiving device of speech is a robot" to 100%.

The user interface related to a case where the electronic device 100 is implemented to provide a machine learning service will be described in greater detail below with reference to FIG. 6.

According to various embodiments, the electronic device 100 may not only efficiently augment learning data for the speech recognition model but also may train the speech recognition model based on the augmented learning data, thereby improving the performance of the speech recognition model.

The electronic device 100 may efficiently augment learning data by reflecting various situations in which speech is uttered, rather than augmenting the learning data in a random manner. In other words, according to the disclosure, a new speech signal may be generated to which a situation that the speech is uttered is reflected by converting an original speech signal based on a probability distribution for each of a plurality of parameters indicating a situation where the speech is uttered. Accordingly, an increase in the learning data augmentation time and an increase in the learning time of the speech recognition model which may be caused as even unnecessary data is included in learning data may be solved.

When the electronic device 100 is implemented to provide a machine learning service, the speech recognition model may be trained based on the augmented learning data in consideration of the user's utterance situation, and the probability information for a parameter corresponding to the desired situation may be set by the user, and thus, a machine learning service having high user satisfaction level can be provided.

FIGS. 4A, 4B and 4C are tables illustrating examples of a plurality of parameters and probability of information for each of the plurality of parameters according to various embodiments.

As described above, the electronic device 100 may obtain probability information for each of a plurality of parameters indicating a situation where a speech corresponding to the first text is uttered. The probability information for each of the plurality of parameters may include at least one of a probability distribution on who is the main body of the speech, a probability distribution of what is a receiving device of the speech, and a probability distribution for where is the utterance place of the speech. Referring to FIGS. 4A to 4C, a probability distribution of a text and a plurality of parameters to be analyzed is illustrated.

The example of FIG. 4A has been described with reference to FIG. 1 above, and the example of FIG. 4B has been described with reference to FIGS. 2 and 3 above, and will not be further described. An example of FIG. 4C will be described in greater detail below.

For example, referring to FIG. 4C, the electronic device 100 may perform language understanding for the first text "let me know the cosmetic brand which is on discount at a department store" and may identify a domain "shopping" and an intent "discount query."

If the domain and the intent identified to correspond to the first text are "shopping" and "discount query," the electronic device 100 may obtain first information including "probability information that the main body of the speech may be a woman is 90% and that the main body may be a man is 10%", "probability information that the receiving device of speech may be a smartphone is 85% and that the receiving device may be a smartwatch is 7%" and "probability information that an utterance place of speech may be a department store is 87% and that a space may be a side of a road is 13%."

When the first information as the embodiment is obtained, the electronic device 100 may obtain second information including at least one of "information about a frequency feature of a speech of a woman", "information about a frequency feature of a speech of a man", "information about a microphone feature of a smartphone," "information about a microphone feature of a smartwatch," "information about a noise feature of a department store," and "information about a noise feature of a side of a road" based on the first information.

The electronic device 100 may obtain a plurality of speech signals so that, among the entire speech signals corresponding to the first text, a ratio of a speech signal between the speech signal including "frequency feature of a speech of a woman" and "a frequency feature of a speech of a man" is 90:10, a ratio of a speech signal between a speech signal including "microphone feature of a smartphone" and "microphone feature of a smartwatch" is 85:7, and a ratio of a speech signal including "noise feature inside a vehicle" and a speech signal including "noise feature of indoor place" is 87:13.

Referring to FIG. 4C, even if the probability that the receiving device may be a smartphone and a probability that the receiving device may be a smartwatch does not fall short of 100%, which means that the probability information for another receiving device other than the smartphone and the smartwatch is not obtained based on the first text. In this case, the disclosure can be applied within the range of the obtained probability information, as described above.

Figure 5A:
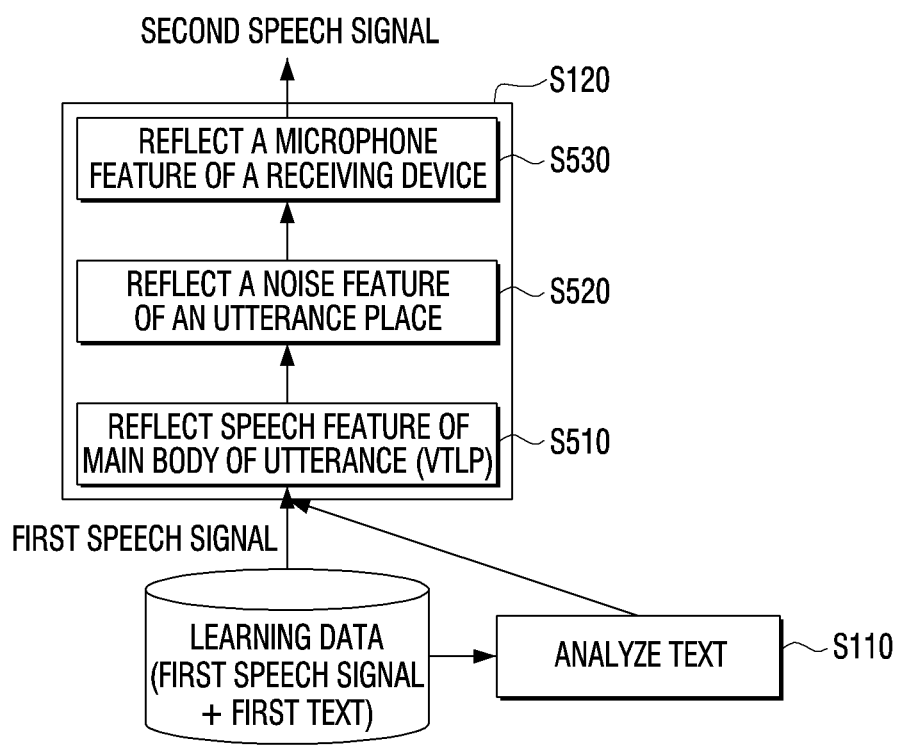
FIG. 5A is a diagram illustrating an example learning data augmentation process according to various embodiments.
Figure 5B:
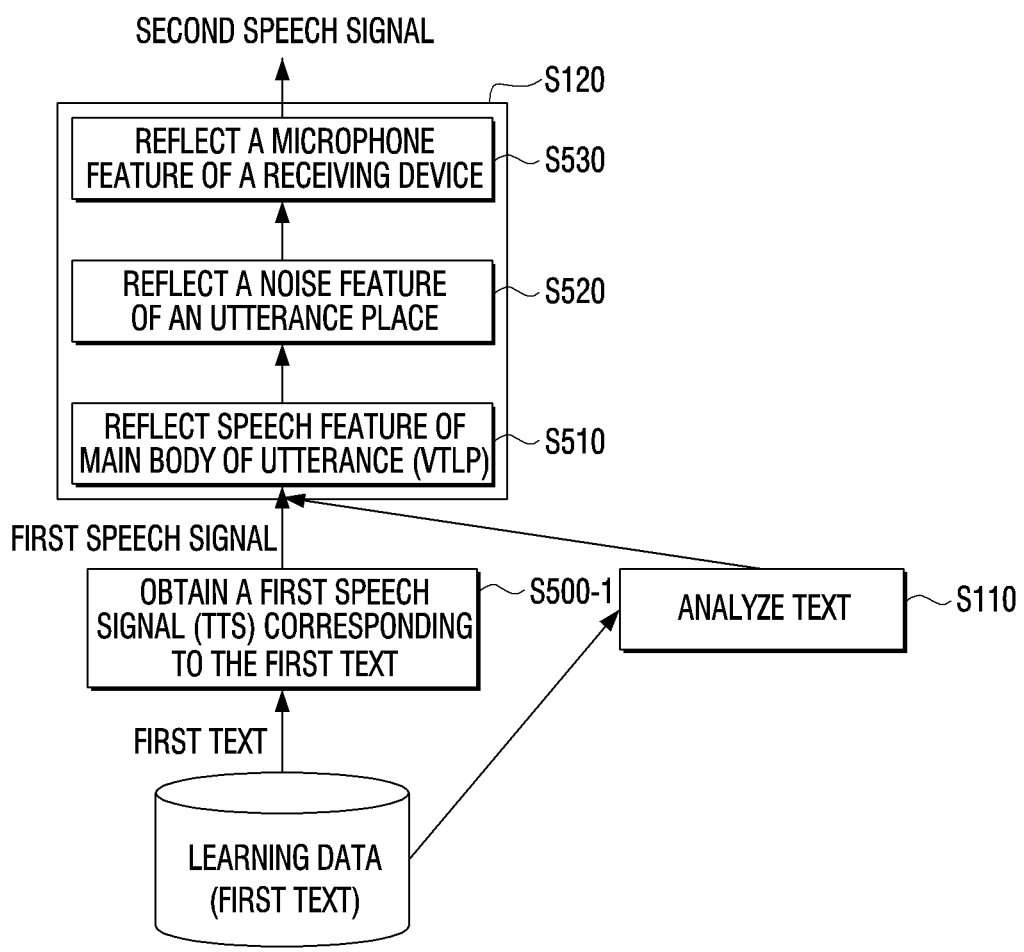
FIG. 5B is a diagram illustrating an example learning data augmentation process according to various embodiments.
Figure 5C:
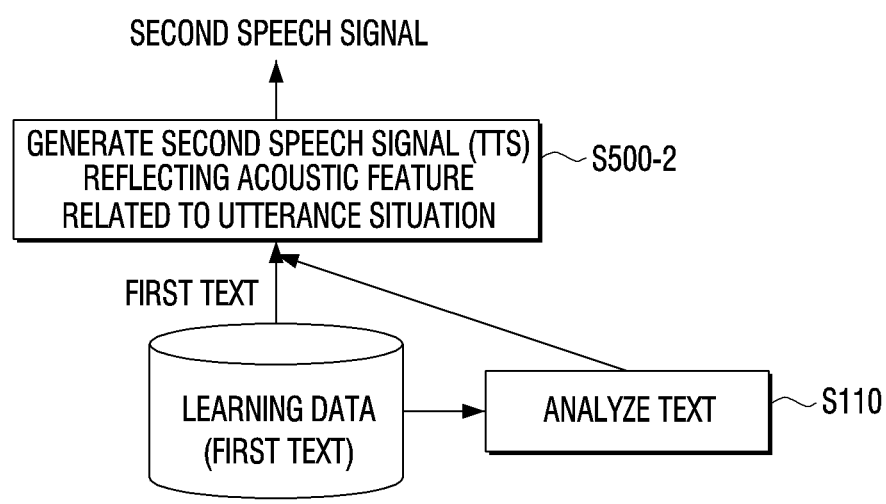
FIG. 5C is a diagram illustrating an example learning data augmentation process according to various embodiments.

FIGS. 5A, 5B and 5C are diagrams illustrating example learning data augmentation processes according to various embodiments.

As described with reference to FIG. 1, the electronic device may analyze the first text included in the learning data in operation S110 and may obtain a second speech signal by augmenting the first speech signal based on the analysis result for the first text in operation S120. The electronic device 100 may obtain the first information related to a situation where the speech corresponding to the first text is uttered through the NLU module 112 and the probability information acquisition module 114, may obtain second information related to the acoustic feature corresponding to a situation where the speech corresponding to the first text is uttered based on the first information through the acoustic feature acquisition module 115, and may obtain a plurality of speech signals corresponding to the first text by converting the first speech signal corresponding to the first text based on the first information and the second information through the speech signal generation module 116.

A process of augmenting the first speech signal through the speech signal generation module 116 and the process of obtaining the second speech signal by reflecting the acoustic feature related to a situation where the speech corresponding to the first text is uttered, to the first speech signal in operation S120 will be further described.

Referring to FIG. 5A, the electronic device 100 may reflect the speech feature of the main body of the speech to the first speech signal in operation S510. For example, the electronic device 100 may obtain a second speech signal by reflecting a pitch, a speed, or the like of a speech corresponding to the main body of the speech to the first speech signal. The electronic device 100 may obtain a second speech signal to which the speech feature of the main body of the speech is reflected using VTLP technology.

The VTLP is a method capable of synthesizing a speech signal reflected with a speech feature of a speech main body. According to the VTLP, a second speech signal to which the speech feature of the main body is reflected may be obtained by obtaining a warping factor corresponding to the speech feature of the main body and warping the frequency axis of the first speech signal according to the obtained warping factor.

The electronic device 100 may reflect the noise feature of the first place of speech (e.g., utterance) to the first speech signal in operation S520. The electronic device 100 may obtain a second speech signal in which noise features of the speech place are reflected using various kinds of noise synthesis techniques to combine the speech signal corresponding to the noise feature of the speech to be synthesized by adding a speech signal corresponding to the noise feature of the speech to the first speech signal. As described above, the noise synthesis technique may include an additive synthesis method for adding a speech signal corresponding to noise to the first speech signal to synthesize a new speech signal, and a modulation synthesis method for synthesizing a new speech signal by modulating the frequency or amplitude of the first speech signal, or the like. The electronic device 100 may obtain a second speech signal in which the noise feature of the speech place is reflected using a room impulse response (RIR) technique.

The RIR technique may measure an indoor impulse response in an indoor space having a desired reverberation, and synthesize the measured indoor impulse response with an original signal. A method for modeling an indoor impulse response includes a finite impulse response (FIR)-based all-zero technique and an infinite impulse response (RIR)-based pole-zero technique, but is not limited to a particular type of RIR technique.

The electronic device 100 may reflect the microphone feature of the receiving device to the first speech signal in operation S530. The electronic device 100 may apply a frequency feature filter for distorting the first speech signal according to different microphone feature according to the receiving device, or may apply various kinds of techniques to compensate for errors according to different microphone features to the first speech signal to obtain a second speech signal reflected by the microphone feature of the receiving device.

The second information related to the acoustic feature corresponding to a situation in which the speech corresponding to the first text is uttered may be pre-stored in the electronic device 100, but may be received from the external device. For example, information about a microphone feature of various kinds of receiving devices and sound source information related to various kinds of microphone features may be received and updated from an external device.

A method for obtaining a second speech signal in which a speech feature of a main body, a noise feature of a speech space, and a microphone feature of a receiving device are reflected in a first speech signal is described, with an assumption that the first speech signal and the first text are included in learning data. According to an embodiment, even when the first speech signal corresponding to the first text is not included in the learning data, a second speech signal in which a speech feature of a main body of the speech, a noise feature of a speech place, and a microphone feature of a receiving device may be obtained. The process of obtaining the second speech signal when the first speech signal corresponding to the first text is not included in the learning data will be s described with reference to FIGS. 5B and 5C.

As illustrated in FIG. 5B, if there is no speech signal corresponding to the first text in the learning data, the electronic device 100 may input the first text to the speech synthesis model to obtain a first speech signal corresponding to the first text in operation S500-1. When a first speech signal corresponding to the first text is obtained through the speech synthesis model, the electronic device 100 may obtain a second speech signal by applying a process as shown in FIG. SA to the obtained first speech signal. For example, the electronic device 100 may reflect the speech feature of the main body of the speech to the first speech signal (e.g., utterance) obtained through the speech synthesis model in operation S510, reflect the noise feature of the speech (e.g., utterance) place to the first speech signal obtained through the speech synthesis model in operation S520) or may reflect the microphone feature of the receiving device to the first speech signal obtained through the speech synthesis model (S530) to obtain a second speech signal.

The process of obtaining a first speech signal corresponding to the first text by inputting the first text to the speech synthesis model in operation S500-1 and the process of reflecting the speech feature of the main body of the speech in operation S510 may be performed in one integrated process. For example, the electronic device 100 may obtain a first speech signal by inputting the first text to a multi-speaker text-to-speech synthesis model to obtain a first speech signal in which a speech feature of the main body is reflected, and then reflect the noise feature of the speech place to the first speech signal in operation S520, and perform a process reflecting the microphone feature of the receiving device to the first speech signal in operation S530 to obtain a second speech signal. The multi-speaker text-to-speech synthesis model refers to an artificial intelligence model capable of synthesizing a speech signal reflected by a speech feature of various speaking persons.

A process of obtaining the first speech signal corresponding to the first text by inputting the first text to the speech synthesis model in operation S500-1, a process of reflecting the speech feature of the speech main body in operation S510, a process of reflecting the noise feature of the speech place in operation S520 and a process of reflecting the microphone feature of the receiving device in operation S530 may be implemented in one integrated process. As illustrated in FIG. 5C, the electronic device 100 may generate a second speech signal by reflecting the acoustic feature associated with the utterance situation based on the first text and the analysis result for the first text in operation S500-2. The electronic device 100 may obtain a second speech signal using a speech feature of the main body, a noise feature of the speech space, and a speech synthesis model configured to reflect the microphone feature of the receiving device in a process of generating a speech signal for the first text.

It has been described that the speech feature of the main body, the noise feature of the speech space, and the microphone feature of the receiving device are sequentially reflected to the first speech signal, but this is merely an example, and the data augmentation process according to the disclosure does not have time-series limitation as illustrated in FIG. 5A or 5B.

It has been described that the speech feature of the speech main body, the noise feature of the speech space, and the microphone feature of the receiving device are reflected in an accumulative manner, but this is merely an example, and it is also possible to obtain second speech signal by independently reflecting only some of the speech feature of the main body, the noise feature of the speech space, and the microphone feature of the receiving device.

FIG. 6 is a diagram illustrating an example user interface when the electronic device 100 is implemented to provide a machine learning service according to various embodiments.

A user interface UI 610 as illustrated in FIG. 6 may be provided through the electronic device 100, but may be provided through an external device connected to the electronic device 100. For example, as described above, the user may transmit at least one of the speech signal and the text to the electronic device 100 through an external device connected to the electronic device 100, and may directly input at least one of the speech signal or the text to the electronic device 100, and the UI to provide at least one of the speech signal and the text may be provided through the electronic device 100 or the external device.

Through the UI 610 as illustrated in FIG. 6, the user can provide at least one of a speech signal or a text to the learning data for the machine learning service. For example, the user may select a name, a description, and a language corresponding to at least one of the speech signal and the text to be provided, and may select a text file corresponding to the audio file and a text file corresponding to the text.

The user may input probability information for a parameter corresponding to a situation desired by a user to a setting information set item 615. For example, as shown in FIG. 6, a user may input situation information of a "discount information query". In this case, how to set the probability of the parameter "discount information query" may be arbitrarily set according to the implementation example of the machine learning service, and the user may directly set up to a probability. When a parameter "discount information query" is input by the user, the electronic device 100 may set the probability for the parameter "discount information query" to preset probability 90%. By further providing additional elements to the UI 610 as shown in FIG. 6, the user may set the probability of the parameter to 100% along with the parameter "discount information query".

According to an embodiment as described above with reference to FIG. 6, at least one of a voice signal and a text may be provided to the electronic device 100 by a user, and the probability information for a parameter corresponding to a desired situation can be set by the user, thereby providing a machine learning service having a high user satisfaction.

FIG. 7 is a flowchart illustrating an example method of learning a speech recognition model according to various embodiments.

The electronic device 100 may perform natural language understanding of the first text included in the learning data in operation S710. For example, the electronic device 100 may input the first text to a natural language understanding model to identify a domain associated with the first text and an intent associated with the first text.

When the natural language understanding is performed, the electronic device 100 may obtain first information related to the situation in which the speech corresponding to the first text is uttered based on the result of the natural language understanding in operation S720. The first information may include probability information for each of a plurality of parameters indicating a situation where a speech corresponding to the first text is uttered. The probability information for each of the plurality of parameters may include at least one of a probability distribution about who is a main body of the speech, and a probability distribution of what is a receiving device of the speech, and a probability distribution about where is the speech place.

Once the first information is obtained, the electronic device 100 may obtain second information related to the acoustic feature based on the first information in operation S730. The second information may include information about the acoustic feature associated with each of the plurality of parameters. The second information may include at least one of information about a speech feature of the main body, information about a microphone feature of the receiving device, and information on a noise feature of the speech place.

When the second information is obtained, the electronic device 100 may convert the first speech signal corresponding to the first text based on the first information and the second information, and may obtain a plurality of speech signals corresponding to the first text in operation S740.

The process of obtaining a plurality of speech signals based on the first information may include obtaining a plurality of speech signals based on probability information for each of the plurality of parameters included in the first information. The electronic device 100 may obtain a plurality of speech signals so that the entire speech signal corresponding to the first text in the learning data includes an acoustic feature of a ratio corresponding to the probability information for each of the plurality of parameters.

The process of obtaining a plurality of speech signals based on the second information may include generating a plurality of speech signals in which the first speech signal is converted by reflecting the acoustic feature associated with the situation where the speech corresponding to the first text is uttered to the first speech signal. The applying the acoustic feature to the first speech signal may refer to applying various kinds of speech signal synthesis techniques to the first voice signal so that a speech signal including the acoustic feature is obtained.

When a plurality of speech signals are obtained, the electronic device 100 may train the speech recognition model based on the obtained plurality of speech signals and the first text in operation S750. For example, when a plurality of obtained speech signals are input to the speech recognition model, the electronic device 100 may train the speech recognition model to output the first text.

The controlling method of the electronic device 100 according to the aforementioned embodiment may be implemented as a program and provided to the electronic device 100. For example, a program including the controlling method of the electronic device 100 may be stored in a non-transitory computer readable medium and provided.

A non-transitory computer-readable recording medium including a program for executing a method for controlling the electronic device 100, the program may include operations including performing natural language understanding for a first text included in learning data, obtaining first information associated with a situation in which a speech corresponding to the first text is uttered based on a result of the natural language understanding, obtaining second information associated with an acoustic feature corresponding to the situation based on the first information, obtaining a plurality of speech signals corresponding to the first text by converting a first speech signal corresponding to the first text based on the first information and the second information, and training the speech recognition model based on the plurality of obtained speech signals and the first text.

The non-transitory computer readable medium may include a medium that stores data semi-permanently rather than storing data for a very short time, such as a register, a cache, a memory, etc., and is readable by an apparatus (i.e., executable by at least one processor). For example, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

The controlling method of the electronic device 100 and the non-transitory computer-readable recording medium including a program for executing a controlling method of the electronic device 100 are described in brief, but this is merely to avoid repetitive description, and the various embodiments of the electronic device 100 may be applied to the controlling method of the electronic device 100, and a computer-readable recording medium including a program executing a controlling method of the electronic device 100.

According to various embodiments, the electronic device 100 may not only efficiently augment learning data for the speech recognition model but also may improve performance of the speech recognition model by training the speech recognition model based on the augmented learning data.

The electronic device 100 according to the disclosure may efficiently augment learning data by reflecting various situations where speech is uttered, rather than augmenting the learning data in a random manner. In other words, according to the disclosure, a new speech signal may be generated by converting an original speech signal based on a probability distribution for each of a plurality of parameters indicating a situation where the speech is uttered by converting an original speech signal. Accordingly, a problem of an increase in the learning data augmentation time and an increase in the learning time of the speech recognition model may be solved.

If the electronic device 100 according to the disclosure is implemented to provide a machine learning service, the speech recognition model may be trained based on the augmented learning data in consideration of the user's utterance situation, and the probability information for a parameter corresponding to the desired situation can be set by the user, thereby providing a machine learning service having high user satisfaction.

In addition, each of the components (e.g., modules or programs) according to various embodiments may include a single entity or a plurality of entities, and some sub-components of the sub-components described above may be omitted, or other sub-components may be further included in the various embodiments. Alternatively or additionally, some components (e.g., modules or programs) may be integrated into one entity to perform the same or similar functions performed by the respective components prior to the integration.

The operations performed by the module, the program, or other component, in accordance with various embodiments may be performed in a sequential, parallel, iterative, or heuristic manner, or at least some operations may be executed in a different order or omitted, or other operations may be added.

The term "unit" or "module" used in the disclosure includes units includes hardware, software, or firmware, or any combination thereof, and may be used interchangeably with terms such as, for example, logic, logic blocks, parts, or circuits. A "unit" or "module" may be an integrally constructed component or a minimum unit or part thereof that performs one or more functions. For example, the module may be configured as an application-specific integrated circuit (ASIC).

Embodiments may be implemented as software that includes instructions stored in machine-readable storage media readable by a machine (e.g., a computer). A device may call instructions from a storage medium and that is operable in accordance with the called instructions, including an electronic device (e.g., the electronic device 100).

When the instruction is executed by a processor, the processor may perform the function corresponding to the instruction, either directly or under the control of the processor, using other components. The instructions may include a code generated by a compiler or a code executed by an interpreter.

The machine-readable storage medium may be provided in the form of a non-transitory storage medium. The, "non-transitory" storage medium may not include a signal and is tangible, but does not distinguish whether data is permanently or temporarily stored in a storage medium. For example, the "non-transitory storage medium" may include a buffer in which data is temporarily stored.

According to various embodiments, a method disclosed herein may be provided in a computer program product. A computer program product may be traded between a seller and a purchaser as a commodity. A computer program product may be distributed in the form of a machine readable storage medium (e.g., compact disc ROM (CD-ROM)) or distributed online through an application store (e.g., Play-Store™) or distributed (e.g., download or upload) online between two user devices (e.g., smartphones) directly. In the case of on-line distribution, at least a portion of the computer program product (e.g., a downloadable app) may be stored temporarily or at least temporarily in a storage medium such as a manufacturer's server, a server in an application store, or a memory in a relay server.

At least one of the plurality of modules may be implemented through an AI model. A function associated with AI may be performed through the non-volatile memory 120, the volatile memory 130, and the processor 140.

The processor 140 may include one or a plurality of processors 140. At this time, one or a plurality of processors 140 may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors 140 control the processing of the input data in accordance with a predefined operating rule or artificial intelligence (AI) model stored in the non-volatile memory 120 and the volatile memory 130. The predefined operating rule or artificial intelligence model is provided through training or learning.

Being provided through learning may refer, for example, to, by applying a learning algorithm to a plurality of learning data, a predefined operating rule or AI model of a desired characteristic being made. The learning may be performed in a device itself in which AI according to an embodiment is performed, and/o may be implemented through a separate server/system.

The AI model may include a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm may include a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

While the disclosure has been illustrated and described with reference to various example embodiments, it will be understood that the various example embodiments are intended to be illustrative, not limiting. One of ordinary skill in the art will understand that various changes in form and detail may be made without departing from the true spirit and full scope of the disclosure, including the appended claims and their equivalents.

What is claimed is:

1. A method of controlling an electronic device, the method comprising:
performing natural language understanding for a first text included in learning data, the learning data including a first speech signal corresponding to the first text;
obtaining first information associated with a plurality of parameters that indicate a situation in which a speech corresponding to the first text being uttered based on a result of the natural language understanding;
obtaining second information associated with an acoustic feature corresponding to the situation in which the speech corresponding to the first text being uttered based on the first information, wherein the acoustic feature includes at least one of information about a microphone feature of a receiving device of the speech and information on a noise feature of a speech space;
obtaining a plurality of speech signals corresponding to the first text by converting the first speech signal based on the first information and the second information; and
training a speech recognition model based on the plurality of obtained speech signals and the first text, wherein:
the first information includes probability information for each of the plurality of parameters,
the plurality of parameters includes a parameter for a main body of the speech, a parameter for the receiving device of the speech, or a parameter for an utterance place of the speech, and
probability information for each of the plurality of parameters includes a probability distribution regarding who is a main body of the speech, a probability distribution regarding what is the receiving device of the speech, and a probability distribution regarding where is the utterance place of the speech.

2. The method of claim 1, wherein the second information further comprises information about a speech feature of the main body of utterance,
wherein the obtaining the plurality of speech signals comprises obtaining a plurality of speech signals comprising at least one of the speech feature of the main body of the utterance, the microphone feature of the receiving device, or the noise feature of the utterance place.

3. The method of claim 1, wherein the probability information of the at least one parameter, among the plurality of parameters, is preset.

4. The method of claim 1, further comprising:
based on a speech signal corresponding to the first text not existing in the learning data, obtaining the first speech signal by inputting the first text to a speech synthesis model.

5. The method of claim 1, wherein the first text is obtained by inputting the first speech signal to the speech recognition model.

6. The method of claim 1, wherein the training further comprises, based on the plurality of obtained speech signals being input to the speech recognition model, training the speech recognition model to output the first text.

7. An electronic device comprising:
a memory configured to store at least one instruction; and
a processor configured to execute the at least one instruction,
wherein the processor, by executing the at least one instruction, is further configured to:
perform natural language understanding for a first text included in learning data, the learning data including a first speech signal corresponding to the first text;
obtain first information associated with a plurality of parameters that indicate a situation in which a speech corresponding to the first text being uttered based on a result of the natural language understanding;
obtain second information associated with an acoustic feature corresponding to the situation in which the speech corresponding to the first text being uttered based on the first information, wherein the acoustic feature includes at least one of information about a microphone feature of a receiving device of the speech and information on a noise feature of a speech space;

obtain a plurality of speech signals corresponding to the first text by converting the first speech signal based on the first information and the second information; and train a speech recognition model based on the plurality of obtained speech signals and the first text, wherein:

the first information includes probability information for each of the plurality of parameters, the plurality of parameters includes a parameter for a main body of the speech, a parameter for the receiving device of the speech, or a parameter for an utterance place of the speech, and probability information for each of the plurality of parameters includes a probability distribution regarding who is a main body of the speech, a probability distribution regarding what is the receiving device of the speech, and a probability distribution regarding where is the utterance place of the speech.

8. The electronic device of claim 7, wherein the second information further comprises information about a speech feature of the main body of utterance, wherein the processor is further configured to obtain a plurality of speech signals comprising at least one of the speech feature of the main body of the utterance, the microphone feature of the receiving device, or the noise feature of the utterance place.

9. The electronic device of claim 7, wherein the probability information of the at least one parameter, among the plurality of parameters, is preset.

10. The electronic device of claim 7, wherein the processor is further configured to, based on a speech signal corresponding to the first text not existing in the learning data, obtain the first speech signal by inputting the first text to a speech synthesis model.

11. The electronic device of claim 7, wherein the first text is obtained by inputting the first speech signal to the speech recognition model.

12. The electronic device of claim 7, wherein the processor is further configured to, based on the plurality of obtained speech signals being input to the speech recognition model, train the speech recognition model to output the first text.

13. A non-transitory computer-readable recordable medium having recorded thereon a program which, when executed by an electronic device causes the electronic device to perform operations for controlling the electronic device, the operations comprising:

performing natural language understanding for a first text included in learning data, the learning data including a first speech signal corresponding to the first text;

obtaining first information associated with a plurality of parameters that indicate a situation in which a speech corresponding to the first text being uttered based on a result of the natural language understanding;

obtaining second information associated with an acoustic feature corresponding to the situation in which the speech corresponding to the first text being uttered based on the first information, wherein the acoustic feature includes at least one of information about a microphone feature of a receiving device of the speech and information on a noise feature of a speech space;

obtaining a plurality of speech signals corresponding to the first text by converting the first speech signal based on the first information and the second information; and training a speech recognition model based on the plurality of obtained speech signals and the first text, wherein:

the first information includes probability information for each of the plurality of parameters, the plurality of parameters includes a parameter for a main body of the speech, a parameter for the receiving device of the speech, or a parameter for an utterance place of the speech, and probability information for each of the plurality of parameters includes a probability distribution regarding who is a main body of the speech, a probability distribution regarding what is the receiving device of the speech, and a probability distribution regarding where is the utterance place of the speech.

* * * * *